United States Patent Office 3,616,499
Patented Nov. 2, 1971

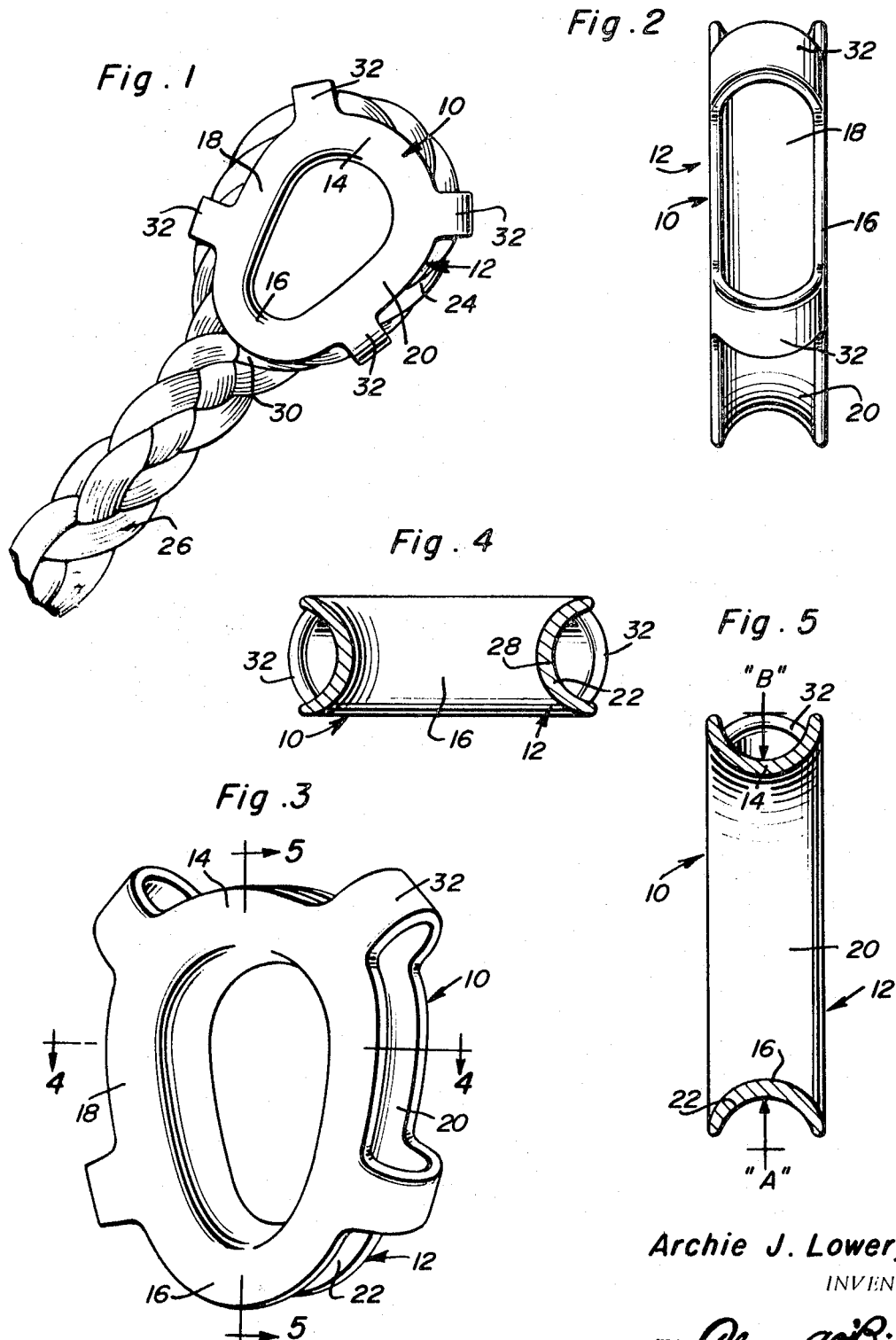

3,616,499
ROPE THIMBLE
Archie J. Lowery, Sr., 500 Ave. J, Marrero, La. 70072
Filed Jan. 14, 1970, Ser. No. 2,865
Int. Cl. F16g *11/04*
U.S. Cl. 24—123 G                6 Claims

ABSTRACT OF THE DISCLOSURE

An elongated open frame including first and second opposite semi-cylindrical end portions opening toward each other and connected by generally straight opposite side frame portions extending between corresponding sides of the end portions. The radius of curvature of the first end portion is generally twice the radius of curvature of the second end portion and the side frame members are convergent toward the second end portion. Further, side and end portions define a semi-cylindrical outwardly opening continuous groove extending about the outer periphery of the frame for seatingly receiving the inner peripheral portions of a cable or rope eye splice therein. Also, the radius of curvature of the semi-cylindrical groove is gradually increased in the area of the smaller radius end portion of the frame and the frame includes peripherally spaced inwardly opening generally semi-cylindrical strap portions formed integrally with the frame which, together with the adjacent portions of the groove, define tubular guide portions for retaining a rope or cable eye splice on the frame.

---

The rope thimble of the instant invention is adapted to be utilized in conjunction with Manila, synthetic or nylon ropes as well as various types of cables and is intended for use with ropes or cables upward to 16 inches in circumference. Accordingly, it will be appreciated that the rope thimble is designed for heavy duty use in the marine towing industry. However, it is to be further appreciated that the thimble can also be utilized in other environments.

Heavy duty rope thimbles conventionally in use are relatively heavy in order to provide maximum high strength at critical points and are therefore difficult to handle. Accordingly, it is the main object of this invention to provide a heavy duty rope thimble constructed in a manner whereby maximum high strength at critical points will be retained and the weight of the thimble will be maintained at a minimum for easier handling.

Another object of this invention, in accordance with the immediately preceding object is to provide a rope thimble whose inside dimensions are sufficient to allow the thimble to be utilized in conjunction with various types of towing shackles of the heavy duty type.

A final object of this invention to be specifically enumerated herein is to provide a rope thimble which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a plan view of the rope thimble of the instant invention as applied to an eye splice formed in a large diameter rope;

FIG. 2 is an end elevational view of the larger end of the rope thimble;

FIG. 3 is a perspective view of the rope thimble;

FIG. 4 is a sectional view taken substantially upon the plane indicated by section line 4—4 of FIG. 3; and FIG. 5 is a sectional view taken substantially upon the plane indicated by section line 5—5 of FIG. 3.

Referring now more specifically to the drawings, the numeral 10 generally designates the rope thimble of the instant invention which may be seen to comprise an elongated open frame referred to in general by the reference numeral 12 including first and second opposite semi-cylindrical end portions 14 and 16 opening toward each other and connected by means of generally straight opposite side frame portions 18 and 20 extending between corresponding sides of the end portions 14 and 16.

The radius of curvature of the large first end portion 14 is generally twice the radius of curvature of the small second end portion 16 and the side and end portions of the frame 12 are all generally semi-cylindrical in cross-sectional shape so as to define a semi-cylindrical outwardly opening continuous groove 22 extending about the outer periphery of the frame 12.

In FIG. 1 of the drawings the rope thimble 10 is illustrated as applied to an eye splice 24 formed in the end of a large diameter rope 26. The concave surfaces 28 of the groove 22 defined by the opposite side and end portions of the frame 12 snugly embrace the corresponding inner peripheral portions of the eye splice 24 and it will be noted from FIG. 5 of the drawings that the radius of curvature A at the smaller radius end of the frame 12 is greater than the radius of curvature B at the larger end portion of the frame 12. The larger radius A is confined to the smaller end of the frame 12 and the smaller radius of curvature B is utilized throughout the remainder of the frame 12. Accordingly, the slightly larger diameter of the rope 26 at 30 is compensated for by the larger radius of curvature A.

The thimble 10 includes a plurality of peripherally spaced inwardly opening generally semi-cylindrical strap portions 32 which are formed integrally with the frame 12. The strap portions 32, together with the adjacent portions of the groove 22, define tubular guide portions for retaining the adjacent portions of the rope on the thimble 10.

From FIGS. 4 and 5 of the drawings it will be noted that the wall thickness of the frame 12 is substantially constant throughout the latter and therefore that the inner peripheral portions of the frame 12 are also generally semi-circular in cross-sectional shape. Thus, the thimble 10 is reinforced by the semi-cylindrical cross-sectional shape of the various wall portions thereof and it will be noted that the spacing and positioning of the strap portions 32 is such that the portions of the rope 26 disposed between adjacent strap portions 32 are reasonably well protected against chafing.

In addition to the above features of the thimble 10, it will be observed that the inside dimensions of the thimble 10 are such to enable heavy duty towing or regular shackles to be utilized in conjunction with the thimbles 10. Also, it will be noted that thimbles constructed in accordance with the present invention will be constructed of strength galvanized steel as well as stainless steel, the latter being utilized primarily in the construction of the largest thimbles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rope thimble comprising an open peripherally continuous frame including first and second large and small radius semi-cylindrical opposite end portions opening toward each other and connected by generally straight opposite side portions extending between corresponding sides of said end portions, said side and end portions defining a peripherally continuous groove extending about said frame generally semi-cylindrical in cross-section and opening outwardly of corresponding peripheral portions of said frame, said groove being adapted to snugly embracingly receive the inner peripheral portions of a rope or cable eye splice extending about said frame, the radius of curvature of said groove being increased throughout the small end portion of said frame.

2. The combination of claim 1 wherein said end and side portions of said frame are semi-cylindrical in cross-sectional shape whereby the inner surface portions of said frame are convex semi-cylindrical.

3. The combination of claim 1 wherein said frame includes integral peripherally spaced inwardly opening generally semi-cylindrical strap portions which, together with the adjacent portions of said groove, define tubular guide portions for retaining the adjacent portions of said eye splice on said thimble.

4. The combination of claim 3 wherein said end and side portions of said frame are semi-cylindrical in cross-sectional shape whereby the inner surface portions of said frame are convex semi-cylindrical.

5. A rope thimble comprising an open peripherally continuous frame including first and second semi-cylindrical opposite end portions opening toward each other and connected by generally straight opposite side portions extending between corresponding sides of said end portions, said side and end portions defining a peripherally continuous groove extending about said frame generally semi-cylindrical in cross-section and opening outwardly of corresponding peripheral portions of said frame, said groove being adapted to snugly embracingly receive the inner peripheral portions of a rope or cable eye splice extending about said frame, the radius of curvature of said groove being increased at one of said end portions of said frame.

6. The combination of claim 5 wherein said frame includes integral peripherally spaced inwardly opening generally U-shaped strap portions spaced about its periphery which, together with the adjacent portions of said groove, define tubular guide portions for retaining the adjacent portions of said eye splice on said thimble.

References Cited

UNITED STATES PATENTS

| | | | |
|---|---|---|---|
| 301,951 | 7/1884 | Betts | 287—81 |
| 1,686,288 | 10/1928 | Meals | 287—81 X |
| 3,083,991 | 4/1963 | Gale | 287—81 |
| 3,174,780 | 3/1065 | Shapiro | 287—81 |

FOREIGN PATENTS

| | | | |
|---|---|---|---|
| 6607250 | 12/1966 | Netherlands | 24—123.6 |

DONALD A. GRIFFIN, Primary Examiner

U.S. Cl. X.R.

287—81